US008924553B2

(12) United States Patent
Schneider

(10) Patent No.: US 8,924,553 B2
(45) Date of Patent: Dec. 30, 2014

(54) MULTIFACTOR VALIDATION OF REQUESTS TO THWART CROSS-SITE ATTACKS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 777 days.

(21) Appl. No.: 12/551,352

(22) Filed: Aug. 31, 2009

(65) Prior Publication Data
US 2011/0055391 A1 Mar. 3, 2011

(51) Int. Cl.
G06F 15/173 (2006.01)
H04L 9/32 (2006.01)

(52) U.S. Cl.
CPC ............ *H04L 9/3234* (2013.01); *H04L 9/3242* (2013.01); *H04L 9/3271* (2013.01); *H04L 9/3297* (2013.01)
USPC ........... 709/225; 709/203; 709/228; 713/168; 713/172

(58) Field of Classification Search
USPC ........... 709/225–228, 202–203; 713/168–172
See application file for complete search history.

(56) References Cited

U.S. PATENT DOCUMENTS

| 6,105,012 | A | 8/2000 | Chang et al. |
| 6,505,300 | B2 | 1/2003 | Chan et al. |
| 7,454,622 | B2 * | 11/2008 | Laidlaw et al. ............... 709/225 |
| 7,478,434 | B1 | 1/2009 | Hinton et al. |
| 7,500,099 | B1 * | 3/2009 | McElwee et al. ............. 713/168 |
| 7,565,135 | B2 * | 7/2009 | Patel ............................. 713/168 |
| 7,984,500 | B1 | 7/2011 | Khanna et al. |
| 8,264,721 | B2 * | 9/2012 | Oomura et al. ............... 713/155 |
| 8,775,818 | B2 | 7/2014 | Schneider |
| 2002/0099936 | A1 | 7/2002 | Kou et al. |
| 2003/0182549 | A1 | 9/2003 | Hallin et al. |
| 2005/0050364 | A1 | 3/2005 | Feng et al. |
| 2005/0183142 | A1 | 8/2005 | Podanoffsky |
| 2006/0064458 | A1 * | 3/2006 | Gehrmann ..................... 709/203 |
| 2007/0143614 | A1 * | 6/2007 | Holtmanns et al. ........... 713/171 |
| 2008/0028447 | A1 | 1/2008 | O'Malley et al. |
| 2008/0077794 | A1 * | 3/2008 | Arnold et al. ................. 713/169 |
| 2008/0082602 | A1 | 4/2008 | Morikawa |
| 2008/0083032 | A1 | 4/2008 | Yamaoka |
| 2008/0115201 | A1 | 5/2008 | Sturms et al. |
| 2008/0222736 | A1 | 9/2008 | Boodaei et al. |
| 2008/0263650 | A1 | 10/2008 | Kerschbaum |
| 2008/0320567 | A1 | 12/2008 | Shulman et al. |

(Continued)

OTHER PUBLICATIONS

Jesse Burns, Cross Site Request Forgery, An Introduction To A Common Web Application Weakness, © 2005, 2007, Information Security Partners, LLC. isecpartners.com/, 9 pages.

(Continued)

*Primary Examiner* — Bharat N Barot
(74) *Attorney, Agent, or Firm* — Lowenstein Sandler LLP

(57) ABSTRACT

An apparatus and a method for validating requests to thwart cross-site attacks is described. A user identifier token, a request identifier token, and a timestamp, are generated at a web application of a server. A Message Authentication Code (MAC) value is formed based on the user identifier token, the request identifier token, and the timestamp using a secret key of the web application. The form is sent with the MAC value and the time stamp to a client. A completed form comprising a returned MAC value and a returned timestamp is received from the client. The completed form is validated at the server based on the returned MAC value and the returned timestamp.

20 Claims, 6 Drawing Sheets

(56) References Cited

U.S. PATENT DOCUMENTS

| | | |
|---|---|---|
| 2009/0144546 A1 | 6/2009 | Jancula |
| 2009/0287922 A1* | 11/2009 | Herwono et al. ............ 713/169 |
| 2010/0088752 A1 | 4/2010 | Nagulakonda et al. |
| 2010/0088761 A1 | 4/2010 | Podjarny et al. |
| 2010/0235918 A1 | 9/2010 | Mizrahi et al. |
| 2010/0299732 A1 | 11/2010 | Zhang et al. |
| 2011/0131416 A1 | 6/2011 | Schneider |
| 2011/0131635 A1 | 6/2011 | Schneider |

OTHER PUBLICATIONS

Menezes, et al., Handbook of Appliced Cryptography, Publisher: CRC Press LLC; 1997.

Red Hat Office Action for U.S. Appl. No. 12/628,121, mailed Jan. 30, 2012.

Red Hat Office Action for U.S. Appl. No. 12/628,121, mailed Jul. 9, 2012.

Red Hat Office Action for U.S. Appl. No. 12/627,864, mailed Feb. 6, 2012.

Red Hat Office Action for U.S. Appl. No. 12/627,864, mailed Jul. 13, 2012.

USPTO; Office Action for U.S. Appl. No. 12/628,121, mailed Mar. 8, 2013.

USPTO; Office Action for U.S. Appl. No. 12/627,864, mailed Apr. 16, 2013.

USPTO; Advisory Action for U.S. Appl. No. 12/627,864, mailed Sep. 26, 2012.

Red Hat Office Action for U.S. Appl. No. 12/628,121, mailed Aug. 9, 2013.

Red Hat Advisory Action for U.S. Appl. No. 12/628,121, mailed Oct. 21, 2013.

Barth et al.; Robust Defenses for Cross-Site Request Forgery, ACM, Oct. 2008; pp. 75-87.

Honkala et al., Secure Web Forms with Client-Side Signatures, Springer-Verlag Berlin Heidelberg; 2005, pp. 340-351.

Jovanovic et al., Preventing Cross Site Request Forgery Attacks, IEEE, 2006, 10 pages.

Maes et al; Browser Protection against Cross-Site Request Forgery, ACM, Nov. 9, 2009, pp. 3-10.

Mao et al., Defeating Cross-Site Request Forgery Attacks with Browser-Enforced Authenticity Protection; Publisher: Springer-Verlag Berlin Heidelberg; Date: Feb. 23-26, 2009; pp. 238-255.

Oda et al.; SOMA: Mutual Approval for Included Content in Web Pages, ACM; Oct. 2008, pp. 89-98.

Shiflett, Chris, Cross-Site Request Forgeries, shiflet.org; Dec. 13, 2004, 47 pages.

Zeller et al; Cross-Site Request Forgeries: Exploitation and Prevention; Publisher: Princeton University; Year: 2008, pp. 1-18.

USPTO; Notice of Allowance for U.S. Appl. No. 12/628,121, mailed May 7, 2014.

USPTO; Office Action for U.S. Appl. No. 12/627,864, mailed Mar. 7, 2014.

USPTO; Notice of Allowance for U.S. Appl. No. 12/627,864, mailed Jul. 29, 2014.

\* cited by examiner

MULTIFACTOR VALIDATION OF REQUESTS TO THWART CROSS-SITE ATTACKS

TECHNICAL FIELD

Embodiments of the present invention relate to computing systems, and more particularly, to web application weaknesses.

BACKGROUND

Cross-Site Request Forgery (XSRF) are a class of serious vulnerabilities that exist in nearly every web application ever deployed. The basic problem is that it is possible for an attacker to host a page with a carefully crafted form that directs a target web application to do anything it could otherwise do, and then trick an authorized user of the web application into submitting the form. For example, the form could submit a request to a bank to transfer money from the victim's account to the attacker's account.

When executed properly, an attack is virtually undetectable—the victim does not see any evidence of it in their browser window, and in the logs of the vulnerable web application, it looks entirely like a completely intentional transaction. Victims will not even be able to prove that they are victims. By destroying the trust required for commerce to function, it is possible that this problem will completely undermine web commerce.

This problem exists because of a security context mismatch web applications assume that a token that proves identity can also be used to prove intent. This vulnerability is implicit in the way browsers operate, and it is made worse by scripting languages embedded in the browser.

While a client side fix could be instituted, this is not scalable—it would require that every vulnerable browser (which is to say, every browser currently installed) be replaced.

A server side fix is a better option. However, this would still require substantial modification to vulnerable web applications. This technique provides a framework for these modifications, with an eye to making them less obtrusive and easier to integrate.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for validating requests to thwart cross site attacks. In one embodiment a user identifier token, a request identifier token, and a timestamp, are generated at a web application of a seer. A Message Authentication Code (MAC) value is formed based on the user identifier token, the request identifier token, and the timestamp using a secret key of the web application. The form is sent with the MAC value and the time stamp to a client. A completed form comprising a returned MAC value and a returned timestamp is received from the client. The completed form is validated at the server based on the returned MAC value and the returned timestamp.

Figure 1:
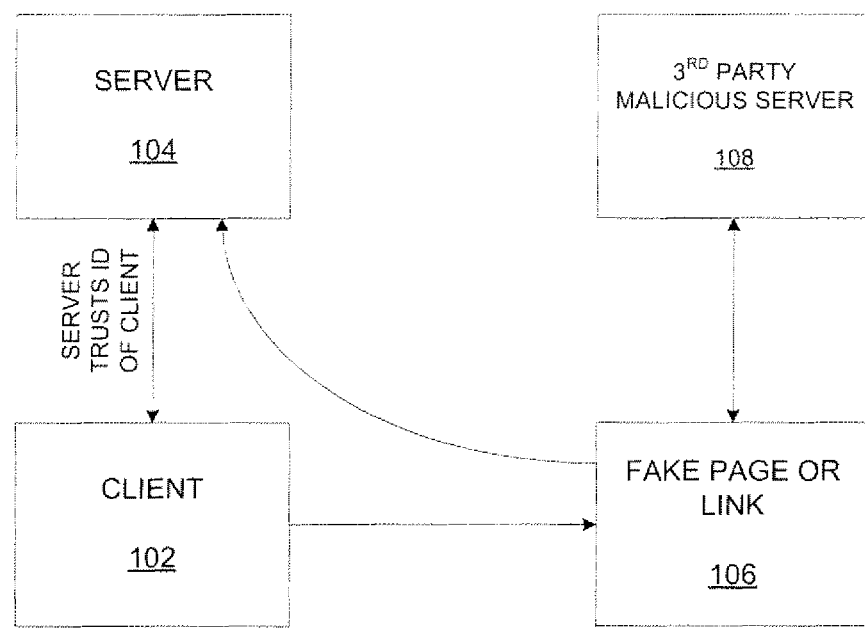
FIG. 1 is a block diagram illustrating a system experiencing a cross-site request forgery attack. A web browser of a client 102 has

FIG. 1 is a block diagram illustrating a system experiencing a cross-site request forgery attack (XSRF). The attack works by including a link or script in a page that accesses a site to which the user is known (or is supposed) to have authenticated. For example, a user at client 102 might be browsing a chat forum where a malicious user (on $3^{rd}$ party malicious server 108) has posted a message. Suppose that the malicious user has crafted an HTML image element 106 that references a script on the user's bank website (bank server 104)—rather than an image file.

<img src="http://bank.example/withdraw?account=user&amount=1000000&for=malicioususer">

If the user's bank (server 104) keeps the user's authentication information in a cookie, and if the cookie has not expired, then the attempt by the user's browser on client 102 to load the image will submit the withdrawal form with the user's cookie, thus authorizing a transaction without the user's approval.

In other words, a cross-site request forgery is a confused deputy attack against a web browser at client 102. The deputy in the above example is the user's web browser which is confused into misusing the user's authority at the direction of malicious user at server 108.

Common characteristics to XSRF are:
sites that rely on a user's identity;
exploiting the site's trust in that identity;
tricking the user's browser into sending HTTP requests to a target site; and
involving HTTP requests that have side effects.

At risk are web applications that perform actions based on input from trusted and authenticated users without requiring the user to authorize the specific action. As illustrated above, a user at client 102 that is authenticated by a cookie saved in his web browser could unknowingly send an HTTP request to a site (server 104) that trusts him and thereby cause an unwanted action.

Figure 2:
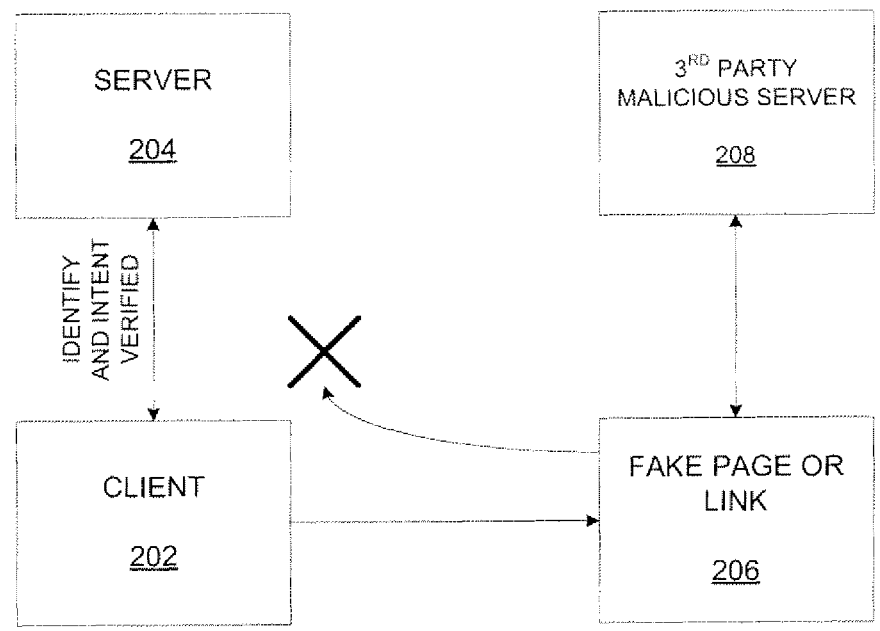
FIG. 2 is a block diagram illustrating one embodiment of a system for preventing cross-site request forgery attacks.

FIG. 2 is a block diagram illustrating one embodiment of a system for preventing cross-site request forgery attacks. Following a similar example of FIG. 1, a user at client 202 is browsing a chat forum where a malicious user (on $3^{rd}$ party malicious server 208) has posted a message. The malicious user has crafted an HTML image element 206 that references a script on the user's bank website (web application of bank server 204).

However, in that case, multi factor validation of the cross-site request are performed at server 204 to verify and validate the identity of the user submitting the request, and the intentional action of the user submitting the request. In one embodiment, such validation factors include two identity tokens and a timestamp to authenticate that a request does in fact represent the intentional action of the user.

These three tokens are concatenated, and the resulting string is run through a Message Authentication Code, using a web application secret key. This MAC value is then associated with the request in the web browser of client 202, and only requests with this MAC are considered intentional.

The first identity token identifies the user of the application. This could either be their user name, or a session token identifier. Using a session token is likely to result in better performance (since the user name/account identifier wouldn't need to be looked up during the validation phase). It also increases the difficulty of a brute force attack by increasing the number and range of variables in the MAC computation. If the session identifier is controlled by the web application, it may (or may not) make chosen plaintext attacks against the MAC algorithm impossible.

The second identity token identifies the request itself. It can be a URL, a request type and account number, or anything else that can be uniquely and unambiguously associated with a particular requested action. It can either be implicit in the request itself, or maintained as a mapping table on the server.

The timestamp identifies the window of time in which the action is valid. This can either be the time at which the MAC is computed, or the last valid time for the action. The timestamp is used to limit vulnerability to replay attacks.

Figure 3:
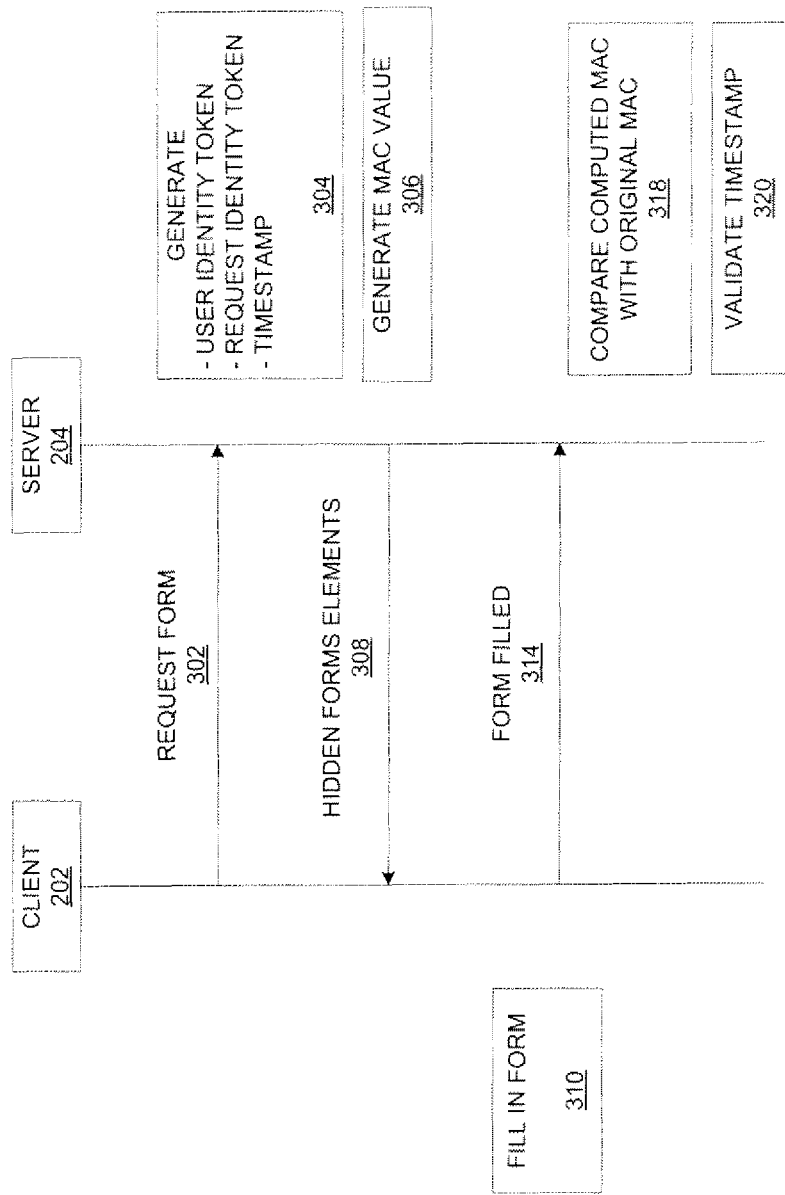
FIG. 3 is a ladder diagram illustrating one embodiment of a system for preventing cross-site request forgery attacks.

FIG. 3 is a ladder diagram illustrating one embodiment of a system for preventing cross-site request forgery attacks between client 202 and server 204. Client 202 submits a request for a form or action 302 to server 204. Server 204 generates a user identifier token, a request identifier token, and a timestamp token at 304. The web application at server 204 calculates the MAC value for each, and adds it to the action request, along with the timestamp.

In one embodiment, the MAC and timestamp could be represented in some self-delimiting, unambiguous form, and then transport coded, or they could be represented separately (for example, a 160 bit MAC and 32 bit timestamp could just be concatenated and base-64 encoded). The encoded value is then represented as a hidden input field in a form 308, or part of the action request URL.

The user at web browser of client 202 fills in the form at 310 and submits the filled form 314 to server 204. Filled form 314 could either be a legitimate request or a malicious non-intentional request from client 202.

Validating that an action is intentional would have the following series of steps:
1) If the MAC value isn't provided by the browser, fail here.
2) Assemble the required parts of the MAC and perform the MAC calculation (318). If the computed MAC doesn't match the browser-provided MAC, fail here.
3) Validate that the timestamp (320) is still valid, or fail.

This could be integrated into web applications. Or, alternately, it could be implemented in an active proxy layer. The proxy layer would inject the required bits into the HTML of pages it serves, validate return requests, and strip out the components it injected.

The proxy solution can be accomplished using different techniques. In one embodiment, it is accomplished by a simple pair of Apache HTTPD filters, together with appropriate configuration.

The timestamp mitigates the possibility of replay attacks, but it does not eliminate the possibility. Elimination could be accomplished by adding a nonce to both the action and the MAC computation, and tracking the nonces that have been issued, and those that have been used. The timestamp should still be used to prevent after-the-fact actions.

An aggressive replay attack prevention technique would be to only track a single nonce per session ID, and require that an action use the current nonce, issuing a new nonce every time a new page is generated. This would have the effect of breaking the back button on the browser, but it would guarantee that cache mining (an attack that is based on examining the user's browser cache for sensitive information that can be used for later attacks) could only yield a single attack. With a short timeout period, even that would be questionable.

Figure 4:
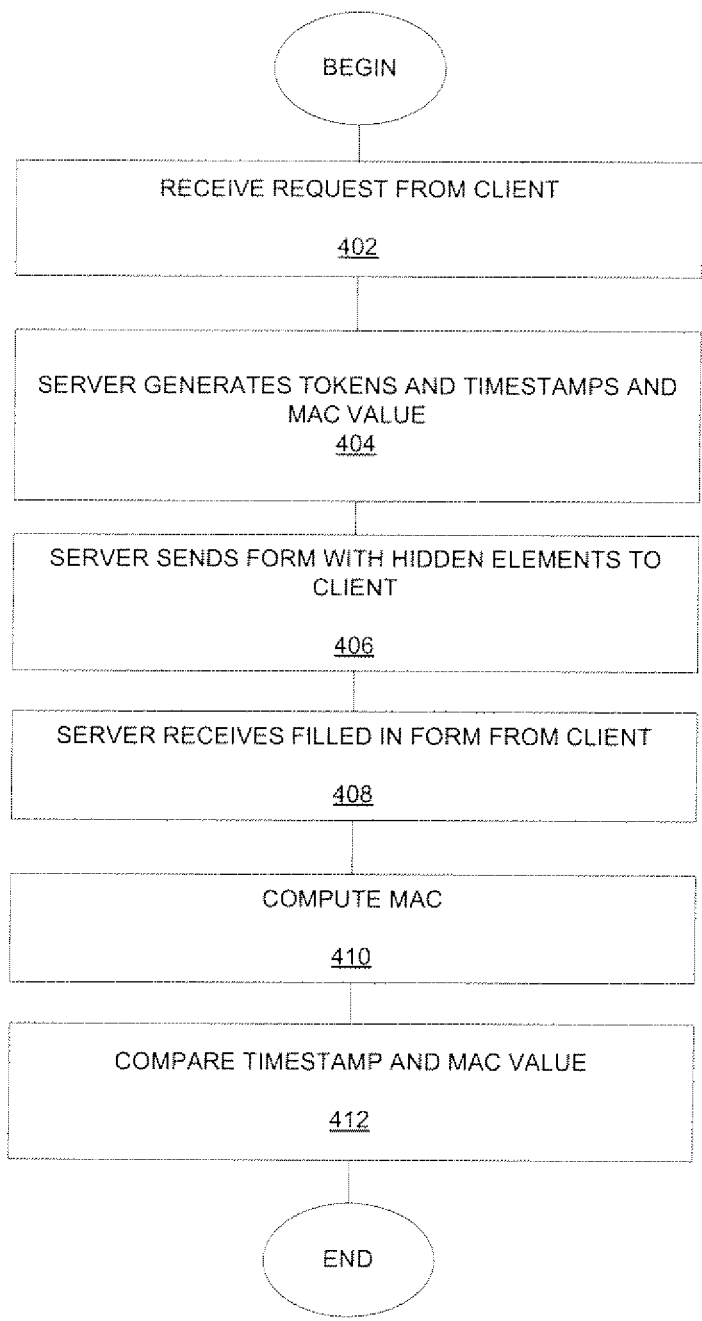
FIG. 4 is a flow diagram illustrating one embodiment of a method for preventing cross-site request forgery attacks.

FIG. 4 is a flow diagram illustrating one embodiment of a method for preventing cross-site request forgery attacks. At 402, a web application of a server receives a request from a client. At 404, the server generates a user identifier token, a request identifier token, and a timestamp in response to the request. The server forms a Message Authentication Code (MAC) value based on the user identifier token, the request identifier token, and the timestamp using a secret key of the web application. At 406, the server sends the form with the MAC value and the time stamp to the client. At 408, the server receives a completed form comprising a returned MAC value and a returned timestamp from the client. At 410, the server computes the MAC value. At 412, the server compares the original MAC value with the returned MAC value, and the original timestamp with the returned timestamp to validate the completed form.

In one embodiment, the user identifier token comprises a user name or a session token identifier. The request identifier token comprises a URL, a request type and account number, or an identifier that is uniquely associated with a particular requested action. The timestamp identifies a window of time in which the completed form is valid, the timestamp comprising a time at which the MAC value is computed, a last valid time for the completed form.

Figure 5:
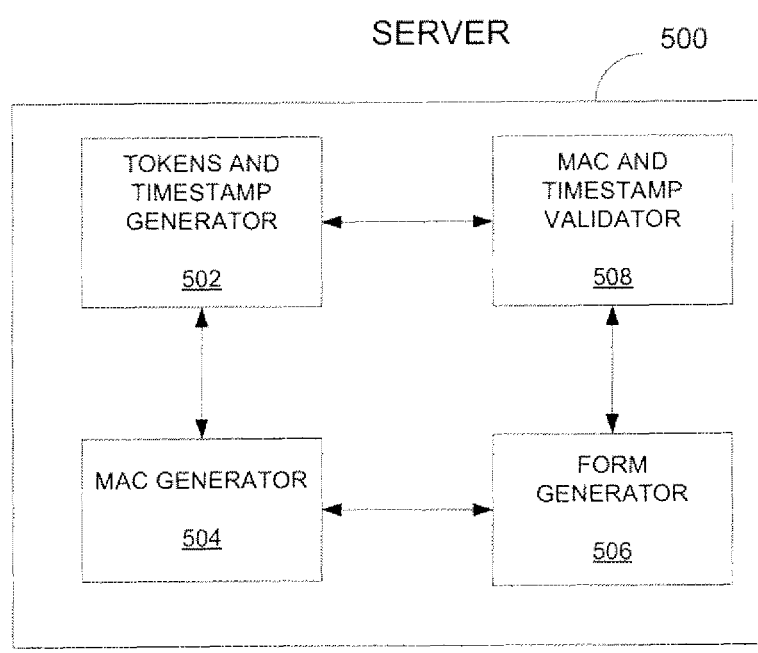
FIG. 5 is a block diagram illustrating one embodiment of a server for preventing cross-site request forgery attacks.

FIG. 5 is a block diagram illustrating one embodiment of a server 500 for preventing cross-site request forgery attacks. Server 500 includes a storage device (not shown), a token and timestamp generator 502, a MAC value generator 504, a form generator 506, and a MAC and timestamp validator 508.

The storage device stores a secret key of a web application of server 500. Token and timestamp generator 502 generates a user identifier token, a request identifier token, and a timestamp. MAC generator 504 generates a MAC value based on the user identifier token, the request identifier token, and the timestamp using the secret key of the web application. Form generator 506 generates and sends the form with the MAC value and the time stamp to the client. MAC value and timestamp validator 508 receives a completed form comprising a returned MAC value and a returned timestamp from the client and validates the completed form based on the returned MAC value and the returned timestamp.

Figure 6:
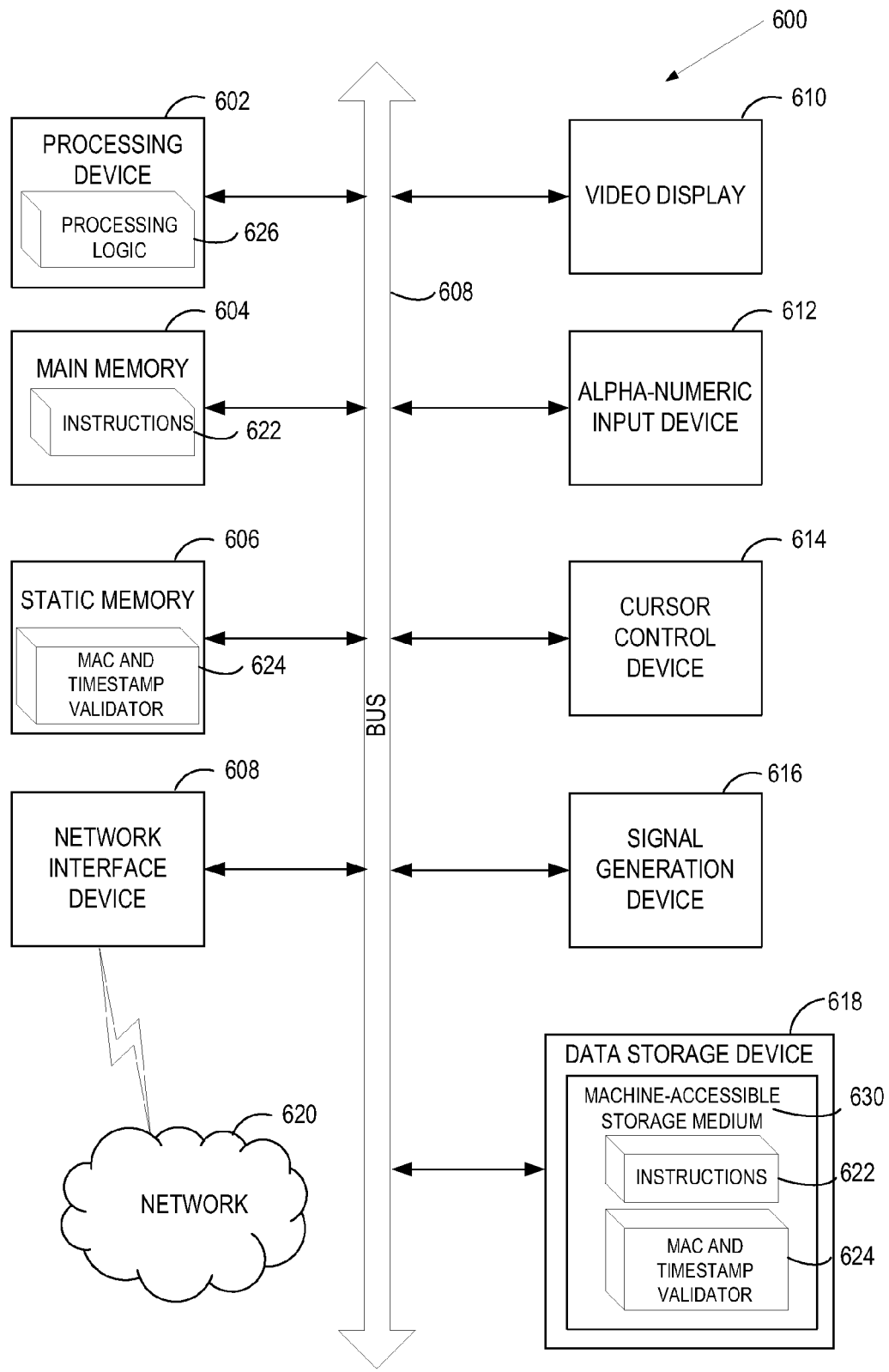
FIG. 6 is a block diagram illustrating an example of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute modules 626 (previously described with respect to FIG. 1) for performing the operations and steps discussed herein with. In one embodiment, the modules may be include hardware or software or a combination of both. In another embodiment, processing device 602 includes a pure function identifier module 628.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-accessible storage medium 630 on which is stored one or more sets of instructions (e.g., table generator software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting computer-accessible storage media. The software 622 may further be transmitted or received over a network 620 via the network interface device 608.

The computer-accessible storage medium 630 may also be used to store the MAC and timestamp generator and validator 622 as presently described. The MAC and timestamp generator and validator 622 may also be stored in other sections of computer system 600, such as static memory 606.

While the computer-accessible storage medium 630 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   generating, by a processing device at a server, a user identifier token, a request identifier token, and an original timestamp, wherein the request identifier token identifies a requested action;

composing, by the server using a secret key, an original Message Authentication Code (MAC) value in view of the user identifier token, the request identifier token, and the original timestamp;

sending, from the server to a client, the original MAC value, the original timestamp, and an original form of a web application hosted by the server;

receiving, at the server from the client, a completed form comprising a returned MAC value and a returned timestamp; and validating, by the server, the completed form in view of the returned MAC value and the returned timestamp.

2. The method of claim 1 further comprising receiving, by the server, a request for the original form from the client, and wherein composing the original MAC value comprises concatenating the user identifier token, the request identifier token, and the original timestamp.

3. The method of claim 1 wherein validating the completed form comprises:

comparing the original MAC value with the returned MAC value; and comparing the original timestamp with the returned timestamp.

4. The method of claim 1 wherein the user identifier token comprises at least one of a user name or a session token identifier.

5. The method of claim 1 wherein the request identifier token comprises at least one of a Uniform Resource Locator (URL) of the requested action, or a request type of the requested action and an account identifier of the requested action.

6. The method of claim 1 wherein the original timestamp identifies at least one of a window of time in which the completed form is valid, a time at which the original MAC value is computed, or a last valid time for the completed form.

7. The method of claim 1 wherein the original MAC value and the original timestamp are in a hidden input field of the original form.

8. A non-transitory computer-readable storage medium having instructions stored therein that, when executed by a processing device, cause the processing device to perform operations comprising:

generating, by the processing device at a server, a user identifier token, a request identifier token, and an original timestamp, wherein the request identifier token identifies a requested action;

composing, by the server using a secret key, an original Message Authentication Code (MAC) value in view of the user identifier token, the request identifier token, and the original timestamp;

sending, from the server to a client, the original MAC value, the original timestamp, and an original form of a web application hosted by the server;

receiving, at the server from the client, a completed form comprising a returned MAC value and a returned timestamp; and validating, by the server, the completed form in view of the returned MAC value and the returned timestamp.

9. The non-transitory computer-readable storage medium of claim 8 wherein the operations further comprise receiving, by the server, a request for the original form from the client, and wherein composing the original MAC value comprises concatenating the user identifier token, the request identifier token, and the original timestamp.

10. The non-transitory computer-readable storage medium of claim 8 wherein validating the completed form comprises:

comparing the original MAC value with the returned MAC value; and comparing the original timestamp with the returned timestamp.

11. The non-transitory computer-readable storage medium of claim 8 wherein the user identifier token comprises at least one of a user name or a session token identifier.

12. The non-transitory computer-readable storage medium of claim 8 wherein the request identifier token comprises at least one of a Uniform Resource Locator (URL) of the requested action, or a request type of the requested action and an account identifier of the requested action.

13. The non-transitory computer-readable storage medium of claim 8 wherein the original timestamp identifies at least one of a window of time in which the completed form is valid, a time at which the original MAC value is computed, or a last valid time for the completed form.

14. The non-transitory computer-readable storage medium of claim 8 wherein the original MAC value and the original timestamp are part of a Uniform Resource Locator (URL) of the requested action.

15. A computer system comprising:

a memory to store a secret key of a web application hosted by the computer system; and a processing device to:

generate a user identifier token, a request identifier token, and an original timestamp, wherein the request identifier token identifies a requested action, compose, using a secret key, an original Message Authentication Code (MAC) value in view of the user identifier token, the request identifier token, and the original timestamp, send, to a client, the original MAC value, the original timestamp, and an original form of the web application, receive, from the client, a completed form comprising a returned MAC value and a returned timestamp, and validate the completed form in view of the returned MAC value and the returned timestamp.

16. The computer system of claim 15 wherein the processing device is further to receive a request for the original form from the client, and wherein the processing device is to compose the original MAC value by concatenation of the user identifier token, the request identifier token, and the original timestamp.

17. The computer system of claim 15 wherein the processing device is to validate the completed form by comparison of the original MAC value with the returned MAC value and the original timestamp with the returned timestamp.

18. The computer system of claim 15 wherein the user identifier token comprises at least one of a user name or a session token identifier.

19. The computer system of claim 15 wherein the request identifier token comprises at least one of a Uniform Resource Locator (URL) of the requested action, or a request type of the requested action and an account identifier of the requested action.

20. The computer system of claim 15 wherein the original timestamp identifies at least one of a window of time in which the completed form is valid, a time at which the original MAC value is computed, or a last valid time for the completed form.

* * * * *